United States Patent
Salamon et al.

(10) Patent No.: US 10,949,473 B2
(45) Date of Patent: Mar. 16, 2021

(54) SYSTEMS AND METHOD FOR SEARCHING AND ANALYZING BIG DATA

(71) Applicant: Knowledge Synthesis, Berkeley, CA (US)

(72) Inventors: Hugh Salamon, Albany, CA (US); Ken D. Yamaguchi, Oakland, CA (US)

(73) Assignee: Knowledge Syntheses, Berkley, CA (US)

( * ) Notice: Subject to any disclaimer, the term of this patent is extended or adjusted under 35 U.S.C. 154(b) by 729 days.

(21) Appl. No.: 14/719,246

(22) Filed: May 21, 2015

(65) Prior Publication Data
US 2016/0070795 A1 Mar. 10, 2016

Related U.S. Application Data

(60) Provisional application No. 62/001,209, filed on May 21, 2014.

(51) Int. Cl.
*G06F 16/00* (2019.01)
*G06F 16/951* (2019.01)

(52) U.S. Cl.
CPC .................. *G06F 16/951* (2019.01)

(58) Field of Classification Search
CPC ....................................................... G06F 17/30
See application file for complete search history.

(56) References Cited

U.S. PATENT DOCUMENTS

| | | | | |
|---|---|---|---|---|
| 6,291,182 B1 * | 9/2001 | Schork | ........... | C12Q 1/6827 435/6.11 |
| 2007/0116267 A1 * | 5/2007 | Speirs, II | ........... | H04L 9/06 380/28 |
| 2007/0162411 A1 * | 7/2007 | Kupershmidt | ........... | G06N 5/02 706/60 |
| 2014/0214331 A1 * | 7/2014 | Kowalczyk | ........... | G06F 19/18 702/19 |
| 2015/0116318 A1 * | 4/2015 | Obrien | ........... | G06F 19/26 345/419 |
| 2017/0206184 A9 * | 7/2017 | Chen | ........... | G06F 17/18 |

OTHER PUBLICATIONS

[No Author Listed] Gene Expression Omnibus Series GSE11393 <http://www.ncbi.nlm.nih.gov/geo/query/acc.cgi?acc=GSE11393> Jun. 3, 2008.

[No Author Listed] Gene Expression Omnibus Series GSE18920 <http://www.ncbi.nlm.nih.gov/geo/query/acc.cgi?acc=GSE18920> Nov. 7, 2009.

Van Es Ma, et al. Genome-wide association study identifies 19p13.3 (UNC13A) and 9p21.2 as susceptibility loci for sporadic amyotrophic lateral sclerosis. Nat Genet. Oct. 2009;41(10):1083-7.

Yamaguchi KD, et al. IFN-beta-regulated genes show abnormal expression in therapy-naïve relapsing-remitting MS mononuclear cells: gene expression analysis employing all reported protein-protein interactions. J Neuroimmunol. Mar. 2008;195(1-2):116-20.

Pestana D, et al. Publication Bias and Meta-Analytic Syntheses. In Advances in Regression, Survival Analysis, Extreme Values, Markov Processes and Other Statistical Applications. Berlin Heidelberg: Springer 2013. 8 pages.

* cited by examiner

*Primary Examiner* — Khanh B Pham
(74) *Attorney, Agent, or Firm* — Mintz Levin Cohn Ferris Glovsky and Popeo, P.C.

(57) ABSTRACT

Systems and methods are provided for ranking and querying statistical analysis results of database contents for the purpose of populating search engine query results with novel content.

24 Claims, 3 Drawing Sheets

SYSTEMS AND METHOD FOR SEARCHING AND ANALYZING BIG DATA

CROSS REFERENCE APPLICATION SECTION

Figure 1:
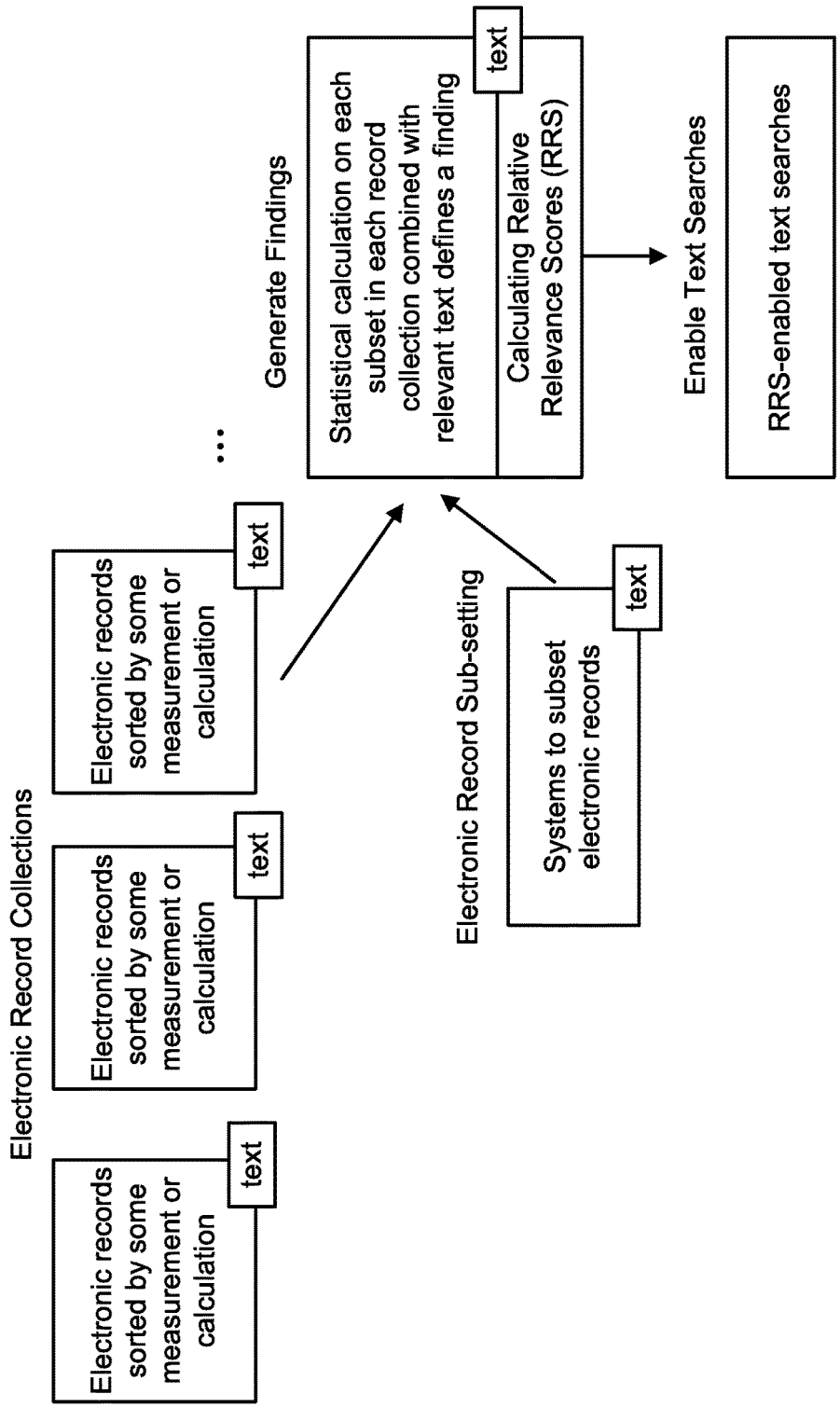

This application claims benefit to U.S. Provisional Patent Application No. 62/001,209, filed May 21, 2014, entitled "Systems and Method for Searching and Analyzing Big Data" of which is herein incorporated for reference.

BACKGROUND

Field of the Invention

The present invention is directed to systems and methods for analyzing data, and more particularly to searching large data collections to generate large numbers of statistically significant findings from large data repositories using automatic computation on subsets of identified electronic records.

Description of the Related Art

Search engines that index documents from the Internet, within an enterprise intranet, or in a database are known. The search algorithm typically identifies all documents that match some specified search criteria, ranks the documents based on a calculated relevance score, and returns a list of documents beginning with the most relevant.

In contrast to text documents, large data repositories are typically queried at a low level (e.g., which values exceed a given threshold), but the data records are not usefully connected to important annotations. The reason is twofold. First, the utility of connecting all data with relevant terms would be very limited for large quantities of data because the numerous terms are not predictably relevant to search queries. Second, numerous data records would receive the same relevance score. There is a need to rank or weight the text associated with the data for the connection to be of any use, and generic methods for such calculations are lacking.

Text search of documents and published or otherwise summarized results from specific data analyses has been performed, and the data collected is query able at a low level in databases. This is done using some form of Structured Query Language.

Large experimental data are not usefully searchable by the text queries that investigators use to drive discovery.

SUMMARY

The present invention provides systems and methods for useful free-text searching on large data collections.

An object of the present invention is to provide systems and methods for searching large data collections to generate large numbers of statistically significant findings from large data repositories using automatic computation on subsets of identified electronic records.

Another object of the present invention is to provide systems and methods for searching large data collections using automatic computation on subsets of identified electronic records and attach text to these findings to enable text searches.

Another object of the present invention is to provide systems and methods for searching large data collections using automatic computation on subsets of identified electronic records and calculate relevance of the findings across numerous different data sources and types of analyses to enable identification of a subset of findings best matching a user query.

DETAILED DESCRIPTION

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein, the term "computer" is a general purpose device that can be programmed to carry out a finite set of arithmetic or logical operations. Since a sequence of operations can be readily changed, the computer can solve more than one kind of problem. A computer can include at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

The systems and the methods of the invention bring results from extensive analysis of life sciences big data to the investigators more easily and quickly than what have been achieved before.

With the present invention, a simple and familiar query interface requires no bioinformatics training or distraction. As a non-limiting example, in one embodiment, the present invention provides millions of otherwise hidden, frequently novel findings derived from public tuberculosis research data. As a non-limiting example, the invention can also be applied to private molecular data collections to unlock the vast potential of proprietary big data.

In one embodiment, the present invention integrates diverse biological knowledge bases, annotation text, and statistics on experimental measurements to generate findings. The findings are then normalized and ranked across experiments and analyses. In one embodiment, an interface is provided where text queries retrieve relevant findings. As a non-limiting example, these can be in the context of searches for regular documents, including but not limited to PubMed searches, and the like. It will be appreciated that the present invention can be used in searching numerical database content outside of the life sciences.

In one embodiment, the present invention provides methods and systems for associating text, concepts, or terms with electronic records as illustrated in FIG. 1. As a non-limiting example, this can be achieved using a computing machine with random-access memory and persistent storage. In one embodiment, one or more computations are made across the electronic records. The records can be from different sources. Subsets of records are used to generate findings, and normalized statistics on these findings are produced. A relevance score across all findings is made with respect to a text query. As a non-limiting example, findings, prioritized by relevance score and user preferences, can be returned to a user interface.

In one embodiment, the electronic records, which can be data objects, are categorized into categories described by text that is relevant to queries. These categories can be overlapping. In another embodiment, the electronic records have predefined or calculated relationships with one another, which as a non-limiting example are defined in a graph where the vertices are described by text that is relevant to queries.

Examples of the preceding are provided in Table 1 which is understood to be non-limiting and provided merely for purposes of illustration.

TABLE 1

Examples of Electronic Records, Categories, Networks, and Ranking Scalars.

| Records | Categories | Network | Ranking Scalar |
| --- | --- | --- | --- |
| Human genes | Biological pathways from Reactome | | Differential expression in familial combined hyperlipidemia patient cells |
| Human genes | | Genomic location of protein coding genes | Differential gene expression in amyotrophic lateral sclerosis anterior horn |
| Stock symbols | Industry sector | | Changes in stock prices in a day in which coal is prominent in news reports |

Figure 2:
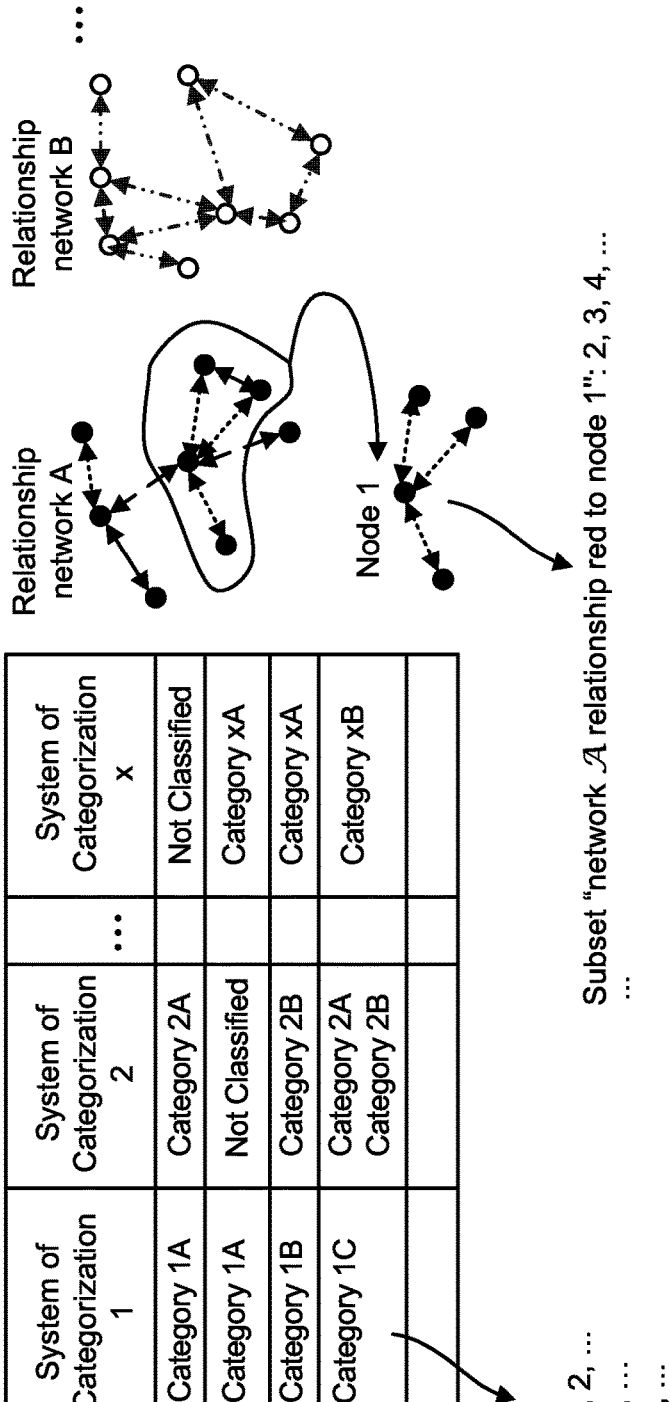

FIG. 2 illustrates the logic of defining subsets of records.

In one embodiment, metadata that describes the ranking scalar is associated with specific categories or network concepts. In this manner otherwise disconnected searchable terms are brought together.

As a non-limiting example, a statistical analysis of atorvastatin-treated familial combined hyperlipidemia (FCH) patient cell gene expression data [1] in the context of protein interaction networks reveals that Moloney leukemia virus 10 (MOV10) is a top differentially expressed network. With the text describing the statin drug experiment, and the text describing articles on MOV10 in human immunodeficiency virus (HIV) research, the concepts statins and HIV are brought together. Similarly, the "HIV Infection" pathway from Reactome is ranked favorably with the present invention and also links statins and HIV.

In one embodiment, the present invention enables the discovery of a potentially important molecule that could play a role in mediating statin anti-viral effects. As statins have been studied for their effects on viral infection, HIV in particular, this otherwise hidden data analysis result is impactful for research.

As a non-limiting example, the present invention is able to bring forward the results for a simple search such as "statin HIV." Without the present invention, the results remain hidden because an investigator interested in statin drugs and HIV is unlikely to investigate FCH experimental results. Moreover, without both the integrated statistical analysis and our ranking of the HIV-related findings, among a multitude of findings from the FCH and other experiments, the relevant findings would remain buried.

As a non-limiting example, a statistical analysis of sporadic amyotrophic lateral sclerosis (ALS) patient anterior horn gene expression[2] reveals a highly significant decrease in expression for chromosomal region 19p13. The most differentially expressed gene in this region is found to be unc-13 homolog A (UNC13A), which contributed to the statistical significance of the finding. A report in Nature Genetics, "Genome-wide association study identifies 19p13.3 (UNC13A) and 9p21.2 as susceptibility loci for sporadic amyotrophic lateral sclerosis," also identifies this region and this gene as important using a completely different type of data [3].

It will be appreciated that the authors of the gene expression study wrote "In the anterior horn enriched mRNA pool, we could not clearly identify mRNA signals or biological enrichment." With the systems and methods of the present invention, statistically significant results missed by other methods are located that match well with current research in ALS. As a non-limiting example, the results are provided in a manner retrievable with simple searches such as "ALS 19p13" or "ALS chromosomal region".

As non-limiting examples, non-biological information searches can be facilitated by the present invention's big data Relative Relevance Scoring (RRS) system. In any situation where data has been repeatedly gathered for electronic records that are sortable by a meaningful quantity or measurement, including but not limited to, price, cost, percent change, size, volume, temperature, or any other quantity, subsets of the records are categorized. The systems and methods of the present invention enable searches using RRS. As a non-limiting example, electronic records can be records of a given type including but not limited to, genes, proteins, people, places, accounts, companies or their stock, time points, manufactured products, electronic transactions or other data and the like.

As a non-limiting example, the electronic records can be summary values for individual stock symbols. As a non-limiting example, these can include a percent change from market open to close.

In one embodiment, the data collections can be the summary values on days of particular interest. As non-limiting examples, these can be days with announcements from the Federal Reserve, natural and political crises, or specific composite index behaviors. In one embodiment, categories of stock symbols can be subsets defined by industry sector, business size or growth measurements, leadership, investors, headquarters, geography, other sub-setting systems and the like. In this way, a search for "renewable energy coal California" retrieves findings derived from days in which news on the coal industry coincided with more extreme changes in stock values among renewable energy companies in California, without the need to specify such a detailed query.

Biomedicine

As a non-limiting example, a data repository of gene transcript measurements from microarray experiments contains measurements from independent genes, and statistical power can be gained by combining these data records, on genes in the example, into categories, such as biological pathways, or they can be combined around relationships which can be transcription factors that bind the genes. With the present invention, models of data consisting of subsets of the gene transcript measurement repository are assigned relevance weights for terms related to biological pathways or transcription factors As non-limiting examples, multiple types of categories can be used to subset genes, including but not limited to genes or gene products (RNA or protein) that are:

1. found experimentally to be expressed in one or more particular cell types;
2. found experimentally to be expressed in one or more particular tissue types;
3. found experimentally to be expressed in one or more particular organs;
4. shared between two or more species or subspecies;
5. found experimentally to be bound by a particular transcription factor;
6. predicted to be bound by particular transcription factors;
7. found experimentally to be bound by a particular microRNA;
8. predicted to be bound by particular microRNAs;
9. found experimentally or by prediction to interact (bind, modify, are modified by, participate in same complex as, participate in same or similar biological functions or processes as) a particular protein or set of proteins;
10. found experimentally or by prediction to interact (bind, modify, participate in same complex as, participate in same or similar biological functions or processes as) a particular chemical species (natural compound, synthetic compound, or drug) or set of chemical species;
11. found experimentally or by prediction to interact (bind, modify, are modified by, participate in same complex, participate in same or similar biological functions or processes as) a particular set of other proteins (natural compounds, synthetic compounds, or drugs);
12. in a biological function or process;
13. in a gene family, defined by phylogenetic analysis, defined by DNA, RNA, or encoded amino acid sequence patterns;
14. encoded by a particular part of a genome (chromosome, genomic interval, proximity to genomic features);
15. found experimentally to contain population variation associated with a phenotype (any trait or measurable biomarker, including disease);
16. of a particular gene structure (size or number of coding regions, exons, introns);
17. found experimentally or by prediction to have coding or non-coding regions or promoters that contain one or more sequence patterns or matches to algorithmic calculations on sequence;
18. identified by bioinformatics analyses of a database of sequences or expression measurements;
19. as well as any combinations of the preceding.

In one embodiment, the present invention generates statistically significant findings that combine descriptive text from different sources. As a non-limiting example, statistical significance for the subsets of genes is determined using tests where the null hypothesis is a) the genes in the subset change (such as differential expression, association with factors or covariates, association with survival, changes in variance, etc.) no more than all the genes measured in the experiment or b) the genes in the subset do not change. Examples of statistical methods to test (a) are CERNO (see the example below), the Mann-Whitney U test, the Wilcoxon Sum Rank test, the hypergeometric test, the Fishert exact test, Gene Set Enrichment Analysis (GSEA) tests such as based on the Kolmogorov-Smirnov statistic, and others. Examples of statistical tests for (b) are the globaltest, methods based on Hotelling's T-squared distribution, and others. Sources of text associated with the findings include descriptive text from the experiment that generated the transcript data and descriptive text for the subsets of genes, such as text that describes subset types 1-19 above.

As a non-limiting example, the findings can include terms from the metadata associated with study samples, such as tumor biopsy samples, terms that describe the model used to score the genes, such as medical terms describing a cancer survival model, and terms from the biological pathway descriptions, such as Gene Ontology categories. Without the statistical relevance calculations and associated text, a query for terms in a particular pathway description co-occurring with terms in a particular experimental description would not return any findings. However, with the calculations and associations, top-ranking results include statistically supported and otherwise invisible experimental findings.

Relevance Score Calculation Using the Coincident Extreme Ranks in Numerical Observations (Cerno) Test Consider a single collection of electronic records ranked by a data-analytic process, which provides the text $T_x$ (for the $x_{th}$ collection of records, among a set of such collections). For example, $T_x$ could be the description of an experiment in which differential gene expression tests were calculated across all gene records measured in a next-generation RNA sequencing project, with the genes ranked by the test results.

Let $S_{yz}$ be the $i^{th}$ subset of electronic records in the $y^{th}$ system of sub-setting such records. This subset provides text $T_{yz}$ describing the subset. For example, $Ty_z$ could be the description of a biological pathway, ontological category, or protein interaction neighborhood, or any other curated or calculated biological grouping.

Figure 3:
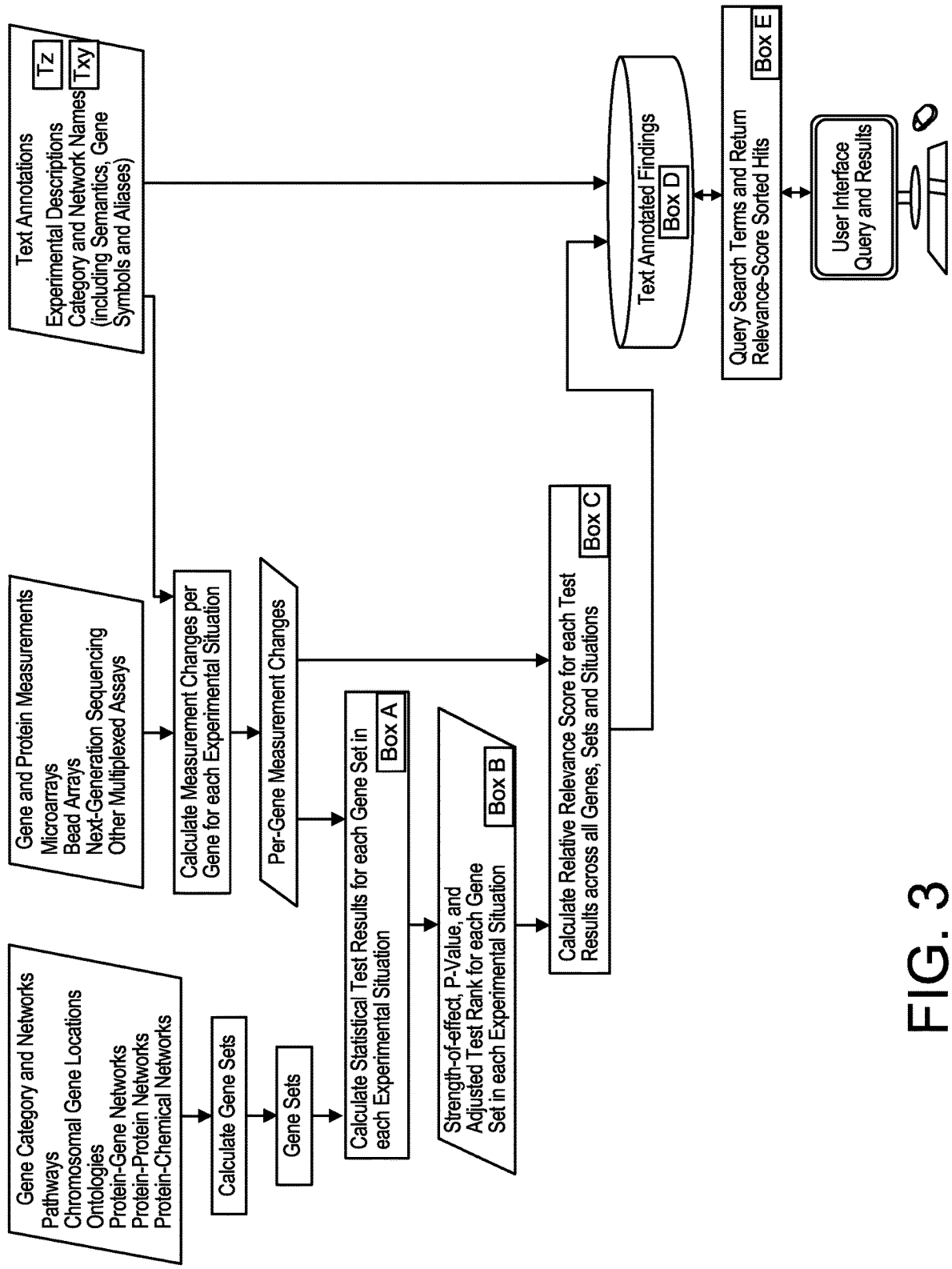

The system and methods of the present invention obtain a CERNO [4] test result, $C_y$, for the $i^{th}$ subset for a particular y. Each test result comprises $p(C_y)$, a p-value, $t(C_y)$, a test statistic (equivalently, $\mu(C_y)$, mean log quantiles of ranks of members of the subset), and $k(C_y)$, the number of records in the subset (FIG. 3, Box A). The p-value in the result can be assigned a false discovery rate (FDR) among all CERNO tests performed in the $y^{th}$ system of sub-setting. The FDR values may be used in filtering results for the user.

For a data collection of n electronic records and a subset of k records (that is, members of a category or neighborhood of related records), let $r_1$ be the rank of the $i^{th}$ record in the entire collection. The magnitude of the geometric mean quantile, scales exponentially with the test statistic used in CERNO, $$-2\sum_{i=1}^{i=k} \ln\left(\frac{r_i}{n}\right) [4].$$

$$-2 \, En \, \ln(L) [4].$$

Define the departure from the expected mean log quantiles for the k records $$D = \mathbb{E}(\mu) - \mu, \quad 10$$

where $$\mu = \left( \prod_{i=1}^{i=k} \frac{r_i}{n} \right)^{\frac{1}{k}} = \exp\left( \frac{1}{k} \sum_{i=1}^{i=k} \ln\left(\frac{r_i}{n}\right) \right),$$

and $$\mathbb{E}(\mu) = \left( \frac{k}{k+1} \right)^k.$$

$\mathbb{E}(\mu)$ is a property of the geometric mean of uniform deviates [e.g., see 5], which closely approximates our expected mean log quantiles pt as n becomes large. The departure from expectation, D, is used to summarize the strength of effect for each test C, and calculate a weighted test result, $W = -\ln[p(C)] * D$. With the present invention, the W values are ranked, largest to smallest, across all test results in the $y^{th}$ system of sub-setting, defining $R_{yz}$ for each test $C_{yz}$. See FIG. 3, Box B. In this way, tests of lower power (for CERNO, tests on sets with few members) will rank better when they have larger effect sizes than they would by ranking p-values alone. A relative relevance score for each test result, $RRS_{yz} = W_{yz}/R_{yz}$, is calculated.

In one embodiment, RRS values are calculated across multiple collections of records and across multiple systems of sub-setting, as in FIG. 3, Box C. For each CERNO test calculated, a relative relevance score is generated, $RRS_{xyz}$. Importantly, associated with each $RRS_{xyz}$ are the text values $T_x$ and $T_{yz}$. The normalized relevance score, $RRS_{xyz}$, the text associated with the record collection, $T_x$, and the text associated with the record subset test performed, Tyz, together constitute a finding. A database of such findings is generated, as in FIG. 3, Box D.

When a user (human or automated) enters a text search query, terms in the query may match terms in $T_x$ and/or $T_{yz}$ values associated with each finding. Such matches, or hits, on the text values retrieve zero or more findings (FIG. 3, Box E). When multiple findings are retrieved, sorting the findings by RRS values (larger to smaller) brings the more relevant findings to the top of the list viewed by the user. Optionally, the RRS values can be weighted by term-matching strength measurements. Additionally, the user may filter results by excluding data collections or systems of record sub-setting.

GENERALIZING RELEVANCE SCORE CALCULATIONS

RRS values can be calculated using tests other than CERNO and with various transformations of test results. One generalizable feature of the normalization is the quotient of a value that captures the significance and strength of a test result and a value dependent on the rank of that test result in a particular series of tests (the set of all $C_z$ for a particular value of y in the example above). This quotient can be represented as $$RRS = \frac{f[p,D]}{g[R]}$$

where
i. f is a function that increases monotonically with both negative log(p), the logarithm (in any base) of the p-value of the test result, and D, a strength-of-effect value which can be expressed as a function of the test statistic, and
ii. g is a function that increases monotonically with R, the rank of a summary test result, generally calculated across all subsets tested in a system of sub-setting.

In the example above, g[R]=R, where R is simply the rank (from largest to smallest) of f[p, D]=W=−ln[p(C)]*D. If g is of the form $R^v$, then larger values of v will emphasize the rank in RRS more, and lower values will emphasize the rank less.

Data Processing

Engines with processors can be used to execute the process flow steps in FIG. 1. The calculation of the relative relevance scores is of the form detailed in the example above, $$RRS = \frac{f[p,D]}{g[R]}$$

Notably, RRS could be calculated in the equivalent form RRS'=f'[p,D]−g'[R], where RRS'=log(RRS), f'=log(f), and g'=log(g). In the latter form, the relevance score is the difference between a function on the statistical results and a penalty value calculated on the rank of the result. The RRS values of each finding, along with the text, $T_x$ and Tyz as in the example above, are stored electronically. The querying of these data will be enabled by an interface allowing the user to specify terms, Boolean relationships, categories of findings, and categories of text across which to search.

The following are all incorporated herein by reference.
1. Gene Expression Omnibus Series GSE11393 http://www.ncbi.nim.nih.govigeo/query/acc.cgi?acc=GSE11393
2. Gene Expression Omnibus Series Series GSE18920 http://www.ncbi.nim.nih.govigeo/Query/acc.cgi?acc=GSE18920
3. van Es M A, et al. Genome-wide association study identifies 19p13.3 (UNC13A) and 9p21.2 as susceptibility loci for sporadic amyotrophic lateral sclerosis. *Nat Genet.* 2009 October; 41(10):1083-7.
4. Yamaguchi K D, et al. IFN-beta-regulated genes show abnormal expression in therapy-naïve relapsing-remitting MS mononuclear cells: gene expression analysis employing all reported protein-protein interactions. *J Neuroimmunol.* 2008 March; 195(1-2):116-20.
5. Pestana D, et al. Publication Bias and Meta-Analytic Syntheses. In *Advances in Regression, Survival Analysis, Extreme Values, Markov Processes and Other Statistical Applications*. Berlin Heidelberg: Springer 2013.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as class, method, type, interface, module, object model, and other suitable concepts. Embodiments were chosen and described in order to best describe the principles of the invention and its practical application, thereby enabling others skilled in the relevant art to understand the claimed subject matter, the various embodiments, and the various modifications that are suited to the particular use contemplated.

What is claimed is:

1. A system for searching and analyzing data, comprising:
an engine configured to rank and query statistical analysis results of database contents that include records, the database contents comprising:
a scalar data field for each of the records;
a categorization of each of the records or a network of relationships among the records;
natural language that describes the scalar data field and the categorization;
a statistical test for each of the records, category of the records, or vertex of the records in the network;
a rank of results of the statistical tests;
a ranking of the test results across multiple analyses of data in which results are statistical test computations normalized by the rank of the results of the statistical tests and normalized by strength of effect of the statistical test computations; and
a final ranking of findings consisting of the rank of the record, category, or network finding; and
a processor configured to receive a search engine query input that includes a query term and that was input by a user to a search engine;
wherein, after the receipt of the search engine query, the processor is configured to adjust the final ranking based on hits of the received query term on the natural language, and the processor is configured to provide a search engine query result to the user based on the adjusted final ranking.

2. The system of claim 1, wherein the statistical test is the Coincident Extreme Ranks in Numerical Observations (CERNO) test, the Wilcoxon Sum Rank (or Mann-Whitney U) test, the Komogorov-Smirnov test, a gene set enrichment analysis test, or other population comparison test.

3. The system of claim 1, wherein the scalar summarizes changed, increased, or decreased gene expression represented as a paired-test p-value, between-groups p value, ratio, T statistic, proportional hazards p-value, time-course statistic, linear model statistic, including mixed effects models, principal components analysis or independent components analysis weightings or machine learning summary statistics, or other statistic.

4. The system of claim 3, wherein the scalar summarizes changed, increased, or decreased proteins or protein expression represented by statistics.

5. The system of claim 1, wherein the scalar summarizes association of single nucleotide polymorphisms (SNPs) with population samples, as in genome-wide association studies (GWAS), or in occurrence of SNPs in disease or other phenotype-affected families.

6. The system of claim 1, wherein the scalar is used to study genes, gene transcripts, or proteins occurring in disease or other phenotypes.

7. The system of claim 1, wherein each of the records is from a different data source.

8. The system of claim 1, wherein each of the records includes descriptive text, and the categorization is based on the record's descriptive text.

9. The system of claim 8, wherein the descriptive text is relevant to possible future search engine queries, and the received search engine query is text.

10. The system of claim 1, wherein the rank of results of the statistical tests is weighted by strength of effect, category size, or sub-network size.

11. A system for searching and analyzing data, comprising:
a memory storing instructions therein; and
a processor configured to receive a search engine query input by a user to a search engine, the search engine query including a query term, and the processor being configured to execute the instructions and thereby:
after the receipt of the search engine query, retrieve findings from a plurality of different data sources each storing a plurality of records each including a text field, the findings being based on a match of the received query term with the text field, and
after retrieving the findings, calculate a statistical test result of the findings, each test result including a p-value and a strength of effect,
calculate a weighted test result using the strength of effect,
rank the weighted test results from largest to smallest,
calculate a relevance score for each weighted test result based on the ranking,
normalize the relevance scores, and
rank query results to be provided to the user in response to the search engine query by ranking the normalized relevance scores from largest to smallest.

12. The system of claim 11, wherein the processor is also configured to execute the instructions and thereby assign a false discovery rate to each of the p-values, wherein the ranking of the query results is also based on the false discovery rate.

13. The system of claim 11, wherein the statistical test is the Coincident Extreme Ranks in Numerical Observations (CERNO) test, the Wilcoxon Sum Rank (or Mann Whitney U) test, the Komogorov-Smirnov test, a gene set enrichment analysis test, or other population comparison test.

14. The system of claim 11, wherein the records relate to studying genes, gene transcripts, or proteins occurring in disease or other phenotypes.

15. The system of claim 11, wherein the records relate to genes, proteins, people, places, accounts, companies or their stock, time points, manufactured products, or electronic transactions.

16. The system of claim 11, wherein the processor is also configured to execute the instructions and thereby cause, in response to the search engine query, the ranked query results to be provided to the user on a user interface of a computer that also includes the processor.

17. The system of claim 11, wherein the retrieved findings include findings that are sub-network intersections of findings across the plurality of different data sources.

18. The system of claim 11, wherein the processor is also configured to provide, on a user interface, the ranked query results in both list form and in faceted form for collections of related ones of the data sources.

19. A method for searching and analyzing data, comprising:
receiving at a processor a search engine query input by a user to a search engine, the search engine query including a query term;
after the receipt of the search engine query, the processor retrieving findings from a plurality of different data sources each storing a plurality of records each including a text field, the findings being based on a match of the received query term with the text field; and
after the retrieval of the findings, the processor calculating a statistical test result of the findings, each test result including a p value and a strength of effect;

the processor calculating a weighted test result using the strength of effect;

the processor ranking the weighted test results from largest to smallest;

the processor calculating a relevance score for each of the weighted test results based on the ranking;

the processor normalizing the relevance scores; and the processor ranking query results to be provided to the user in response to the search engine query by ranking the normalized relevance scores from largest to smallest.

20. The method of claim 19, further comprising the processor assigning a false discovery rate to each of the p-values, wherein the ranking of the query results is also based on the false discovery rate.

21. The method of claim 19, wherein the statistical test is the Coincident Extreme Ranks in Numerical Observations (CERNO) test, the Wilcoxon Sum Rank (or Mann Whitney U) test, the Komogorov-Smirnov test, a gene set enrichment analysis test, or other population comparison test.

22. The method of claim 19, wherein the records relate to studying genes, gene transcripts, or proteins occurring in disease or other phenotypes.

23. The method of claim 19, wherein the records relate to genes, proteins, people, places, accounts, companies or their stock, time points, manufactured products, or electronic transactions.

24. The method of claim 19, further comprising the processor causing, in response to the search engine query, the ranked query results to be provided to the user on a user interface of a computer that also includes the processor.

\* \* \* \* \*